United States Patent [19]

Coffey et al.

[11] Patent Number: 4,490,521

[45] Date of Patent: Dec. 25, 1984

[54] PREPARATION OF SPINNABLE POLYAMIDE FROM DINITRILE/DIAMINE/WATER WITH METAL SALT OF OXYGENATED PHOSPHORUS COMPOUND CATALYST

[75] Inventors: Gerald P. Coffey, Lyndhurst; Robert C. Sentman, Macedonia; Benedict S. Curatolo, Maple Heights, all of Ohio

[73] Assignee: The Standard Oil Company, Cleveland, Ohio

[21] Appl. No.: 540,596

[22] Filed: Oct. 11, 1983

[51] Int. Cl.³ .............................................. C08G 69/28
[52] U.S. Cl. ..................................... 528/336; 528/337
[58] Field of Search ........................................... 528/336

[56] References Cited

U.S. PATENT DOCUMENTS

| | | | |
|---|---|---|---|
| 2,245,129 | 6/1941 | Greenewalt | 528/335 |
| 3,847,876 | 11/1974 | Onsager | 528/335 |
| 4,436,898 | 3/1984 | Hofmann et al. | 528/336 |

*Primary Examiner*—Harold D. Anderson
*Attorney, Agent, or Firm*—David P. Yusko; John E. Miller, Jr.; Larry E. Evans

[57] ABSTRACT

The process for manufacturing a spinnable polyamide from a dinitrile, a diamine, water and a catalyst is improved by using as a catalyst a metal salt of an oxygenated phosphorus compound. For example, high quality nylon-6,6 is manufactured by contacting adiponitrile, hexamethylene diamine, water and disodium phosphite at an elevated temperature and pressure.

19 Claims, No Drawings

PREPARATION OF SPINNABLE POLYAMIDE FROM DINITRILE/DIAMINE/WATER WITH METAL SALT OF OXYGENATED PHOSPHORUS COMPOUND CATALYST

BACKGROUND OF THE INVENTION

1. Field of the Invention

This invention relates to polyamides. In one aspect, the invention relates to a process for manufacturing spinnable polyamides from an $\alpha,\omega$-dinitrile and an $\alpha,\omega$-diamine while in another aspect, the invention relates to a process utilizing an oxygenated phosphorus compound as a catalyst. In still another aspect, the invention relates to an improved process for manufacturing nylon-6,6 from adiponitrile and hexamethylene diamine utilizing a catalyst of a metal salt of an oxygenated phosphorus compound.

2. Description of the Prior Art

The art is replete with references describing various methods for preparing commercially available nylons from diamines and dicarboxylic acids. The art also contains teachings for preparing nylons from diamines and dinitriles. For example, U.S. Pat. No. 2,245,129 by Greenwalt describes a method for producing a linear polyamine by heating a reaction mixture of a dinitrile, a diamine and water. The procedure consists of two stages. In the first stage the reaction mixture is heated in a closed reaction vessel until a low molecular weight polyamide is formed while in the second stage, this low molecular weight polyamide is converted to a high molecular weight polyamide upon additional heating.

U.S. Pat. No. 3,847,876 by Onsager teaches another method for preparing a high molecular weight polyamide comprising contacting a dinitrile, a diamine and water. The Onsager process requires at least equal molar amounts of diamine and dinitrile to be intially present in the reaction mixture and further requires that the polymerization occur in the presence of controlled amounts of ammonia, preferably in the presence at least three weight percent based on the total weight of the diamine, dinitrile and water. This generally entails addition of ammonia to the reaction mixture over the course of the reaction.

Recently Hofmann et al., EPC Application No. 82104222.3, disclose an improved method for preparing a high molecular weight polyamide from a dinitrile, diamine and water by conducting the polymerization in the presence of an oxygenated phosphorus compound, such as phosphoric acid, or an ammonium or ammonium alkyl salt of the acid. This process reduces the conventional reaction time of the polymerization and produces a high molecular weight, linear polyamide having desirable weight loss spinning properties.

While all of the above methods and others known in the art demonstrate utility for manufacturing linear polyamides, the nylon fiber industry continues to seek manufacturing improvements which result in superior quality polyamide. Of particular interest are process improvements which will result not only in reduced operation cost and the corresponding increase in operation efficiency, but which will also result in a spinnable polyamide that will have superior weight loss properties.

SUMMARY

According to this invention, the process for manufacturing a spinnable polyamide from an $\alpha,\omega$-dinitrile, an $\alpha,\omega$-diamine, water and an oxygenated phosphorus compound catalyst, the contacting conducted at an elevated temperature and pressure, is improved by using as the catalyst a metal salt of the oxygenated phosphorus compound. The spinnable polyamides manufactured by this process have improved weight loss characteristics (as compared to those manufactured by a process using catalysis by ammonium or ammonium alkyl salts of the acid or the acid alone) which make the polyamides easier to process during spinning.

DETAILED DESCRIPTION OF THE INVENTION

Monomers

The $\alpha,\omega$-diamines here used are of the formula

$$R'HN-R-NHR' \tag{I}$$

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic, alicyclic or aromatic radical and each one of these radicals can also bear one or more inert substituents. By the term "inert" is meant that the substituent is essentially nonreactive with the reactants, catalysts and products of the process under process conditions. Typically, R is a divalent $C_1$–$C_{20}$ aliphatic radical, a divalent $C_5$–$C_{18}$ alicyclic radical or a divalent benzene radical and preferably R is a $C_2$–$C_8$ straight chain alkylene radical. Typically, R' is hydrogen or a $C_1$–$C_{20}$ aliphatic radical, $C_5$–$C_7$ alicyclic or a phenyl radical. Preferably, R' is hydrogen or a $C_1$–$C_4$ alkyl radical. Representative diamines include tetramethylene diamine, hexamethylene diamine, p-diaminodicyclohexylmethane, 4,4'-diaminodicyclohexyl ether, 4,4'-diaminodicyclohexyl sulfide, 4,4'-diaminodicyclohexyl sulfone, octamethylene diamine, decamethylene diamine, dodecamethylene diamine, 1,4-dimethyleneamino-1-phenyl-1,2,3,4-tetrahydronaphthalene and the like. Hexamethylene diamine is an especially preferred diamine.

The dinitriles here used are of the formula

$$NC-R-CN \tag{II}$$

where R is as previously defined. Representative dinitriles include glutaronitrile, succinonitrile, adiponitrile, suberonitrile, sebaconitrile, 1,10-decane dinitrile, methyl glutaronitrile, $\alpha$-methylene glutaronitrile, 1,4-dicyano-1-phenyl-1,2,3,4-tetrahydronaphthalene and the like. Adiponitrile is an especially preferred nitrile.

The Catalyst

The hallmark of this invention is the use of a metal salt of an oxygenated phosphorus compound as the catalyst. Preferred catalysts are the metal salts of phosphoric acid, phosphorous acid, hypophosphorus acid, an alkyl or aryl phosphonic acid, or an alkyl or aryl phosphinous acid. Representative metal salts of alkyl and aryl phosphonic and phosphinous acid include the metal salts of methyl, ethyl, propyl, isopropyl, phenyl, tolyl, etc., phosphonic and phosphinous acid.

Any metal that will form a salt with an oxygenated phosphorus compound, particularly with phosphoric, phosphorous, hypophosphorous, and the alkyl and aryl phosphonic and phosphinous acids, can be used in this invention and the preferred metals are univalent metal cations, e.g. Na+, Li+, Cu+, Hg+, etc., with the alkali metals, particularly lithium and sodium, more preferred. Especially preferred catalysts are the lithium and sodium salts of phosphorous acid and phosphoric acid, particularly the disodium, dilithium and sodium/lithium salts.

The catalyst can be either added per se to the reaction mixture or can be generated in situ. Preferably, the catalyst is generated in situ by adding at some point during the course of the reaction, preferably after the low molecular weight polyamides are formed, a source of metal cation such as a metal hydroxide (e.g. sodium hydroxide), to the reaction mixture (which already contains an oxygenated phosphorus compound, such as phosphorous or phosphoric acid).

One method for determining when the low molecular weight polyamides have been formed is by measuring the amount of ammonia evolved from the reaction mixture. Generally, the metal cation is not added until after at least about 75 percent of the theoretical amount of ammonia produced by the reaction has been evolved, preferably not until after about 90 and more preferably not until after 95 percent. Other methods for determining the optimum metal cation addition time is measuring the bulk or intrinsic viscosity of a sample taken from the reaction mixture. However and as noted earlier, the metal cation can be added to the reaction mixture earlier or even at the outset although this generally results in a reduced rate of hydrolysis (longer residence time).

While not being bound to theory, the hydrolysis of the dinitrile is believed to be accelerated by the acidity (protons) of the oxygenated phosphorus compound and a reduction of this acidity (by neutralization with a metal cation) reduces the acceleration of the hydrolysis. However, once this hydrolysis is complete (i.e. the low molecular weight polyamides are formed), then the acidity of the oxygenated phosphorus compound no longer contributes to the acceleration of the process, i.e. formation of the high molecular weight polyamides, and is in fact actually detrimental to the stability of the final product. This does not mean that the acidity of the catalyst prevents the formation of high molecular weight polyamides because it does not as evidenced by bulk and intrinsic viscosity measurements on the final product. However, the stability of the final product is reduced by this acidity (presently there does not exist a ready means for separating the catalyst from the product and thus it becomes part of the product) as evidenced by the TGA weight loss (between 325°–390° C. for nylon-6,6). This property is an important measurement of the polyamide's processing characteristics with a lower TGA weight loss corresponding to better polymer stability during processing, e.g. fiber spinning. Thus, it is desirable to neutralize the acidic protons of the catalyst by forming its salt, usually before the high molecular weight polyamides are formed to facilitate the physical mixing of the catalyst and metal cation.

Preferably, the oxygenated phosphorus compound is contacted with sufficient metal cation to neutralize its most acidic protons, e.g. phosphorous and phosphoric acid are contacted with two equivalents of a metal hydroxide, such as sodium hydroxide. This is sufficient cation to neutralize the two most acidic protons of these acids. Neutralization of the third proton in phosphoric acid does not materially impact the effect of the catalyst on the stability of the high molecular weight polyamide.

Similarly, use of less cation than necessary to neutralize the most acidic protons, e.g. 1.0 equivalent of sodium hydroxide with phosphorous or phosphoric acid, improves the effect of the catalyst on the stability of the high molecular weight polyamide but not to the extent of the more fully neutralized compounds, e.g. those prepared from contact with 2 equivalents of sodium hydroxide. In short, the use of either too little or too much metal cation to neutralize the acidic protons of the compound, e.g. 1.9 or 2.1 equivalents of sodium hydroxide to neutralize phosphorous acid, will improve the effect of the catalyst on the stability of the final product over an unneutralized phosphorus compound but not to the extent of a near-balanced neutralized compound.

Sufficient catalyst is employed to promote the polymerization of the diamine and dinitrile with a typical amount between of about 0.001 to about 1 weight percent, based upon the total weight of the diamine, dinitrile and water, preferably of about 0.01 to about 1 weight percent, and more preferably of about 0.1 to about 1 weight percent.

The manner in which the catalyst or oxygenated phosphorus component (e.g. phosphorous acid) of the catalyst is added to the monomers can vary, e.g. addition as a separate component to a mixture of monomers or initially combined with one of the monomers prior to admixture with the other monomer.

Process Parameters

High molecular weight, linear polyamides having desirable weight loss properties are prepared by forming a reaction mixture of the dinitrile, diamine, water and catalyst. This reaction mixture can be formed by any one of a number of different methods. One method is the gradual addition, either continuously or incrementally, of the diamine to the dinitrile over the course of the hydrolysis portion of the reaction (polymerization). Typically, in this method less than 50 mole percent of the diamine, preferably less than 5 mole percent, is admixed with the dinitrile with the remainder of the diamine added gradually over the course of polymerization. Another method and one preferred due to its simplicity of operation is a batch addition of all reactants at the commencement of the reaction.

The reaction itself is preferably conducted in a batch mode because it facilely accommodates the in situ generation of the catalyst. However, the reaction can also be conducted in a continuous mode, i.e., continual addition of the reactants with concomitant removal of product, if desired. An example of a continuous mode process is the use of a cascade reactor arrangement.

Water is necessary to the process as both a reactant and as an aid in formation of the polyamide. Consequently, usually an excess of water is present in the reaction mixture over at least a part of the polymerization but preferably the initial water content of the reaction mixture does not exceed about 25 weight percent of the total weight of the reaction mixture, more preferably it does not exceed 15 weight percent. Assuming less than or about 15 weight percent water is present at the start of the reaction, then as the polymerization proceeds additional water is gradually added to the reaction mixture until water constitutes about 20 weight percent of the mixture. Although it is not desired, more water can be used. However, since the water will have to be removed from the reaction product at the end of the polymerization, preferably the amount of excess water is kept to a minimum (20 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the practice of this invention and it can thus be either added alone or in combination with the dinitrile or diamine.

Ammonia is a byproduct of the reaction of the diamine, dinitrile and water. As a consequence, ammonia is constantly being generated within the reaction mixture but it typically enters the vapor phase and is preferably continuously removed from reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6,6 resin is prepared from adiponitrile, hexamethylene diamine and water by continuously removing substantially all of the ammonia generated during the polymerization but while retaining all of the water. The water is eventually removed from the reaction system after the low molecular weight polyamides are formed, i.e. the hydrolysis of the dinitrile is essentially complete as evidenced, for example, by the amount of ammonia that has evolved since the start of the reaction.

As is well known in the art, e.g. U.S. Pat. No. 3,847,876, the polymerization of a diamine and a dinitrile to form a high molecular weight, linear polyamide is best conducted over a temperature/pressure profile that varies over the course of the polymerization. The temperature/pressure profile will, of course, vary with the specific reactants employed as well as with such factors as the nature and amount of catalysts, mode of operation (batch versus continuous), configuration of the reaction vessel, etc. For the manufacture of nylon-6,6 from adiponitrile, hexamethylene diamine and water, a temperature/pressure profile comprising at least two stages is typically employed, both preferably conducted in the absence of air ($O_2$). During the first stage of the polymerization, the temperature is maintained at 200°–300° C., preferably 240°–270° C., under autogenous pressure (typically about 200 to about 800 psi absolute) for a period of time sufficient to form low molecular weight polyamides, e.g. polyamides having a weight average molecular weight of less than about 10,000, generally less than about 5,000 as measured by intrinsic viscosity. Ammonia is removed from the reaction vessel while maintaining the water concentration at a level sufficient for polymerization to proceed, typically in excess of 14 weight percent. At the completion of the first stage (which is the start of the second stage), the pressure is gradually reduced to atmospheric or subatmospheric pressure and the temperature is gradually increased, preferably to between about 260°–295° C. During this second stage, relatively low molecular weight polyamides are combined to form the high molecular weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide

The polyamides produced by this invention have a nylon structure, i.e. polyamide linkages as part of the polymer backbone, as opposed to polyacrylamides which have an essentially all carbon backbone. These polyamides have a relatively high molecular weight and are characterized by having relatively high onset decomposition temperatures (ODT). This property is directly related to the stability of the polymer, the higher the ODT, the more thermally stable the polyamide. Typically, the polyamides produced by this invention have an ODT higher than about 330° C. which is of economic value in the marketplace since such polyamides will undergo less thermal degradation during processing. For example, fiber spinning apparatus will require less down time for cleaning when processing a relatively high ODT polyamide than when processing a lower ODT polyamide.

In addition, thermal gravimetric analysis (TGA) shows that the polyamides made by this invention have relatively low weight loss.

Although not completely understood at this time, the polyamides produced by this invention are believed to have very desirable thermal stability characteristics because they contain few, if any, defect structures. A defect structure is simply a branch or side chain attached to the polymer backbone which is formed when a monomer, oligomer or low molecular weight polymer attaches to the polymer backbone as a pendent substituent rather than as an integral part of the backbone itself. Although these defect structures may be present in relatively low concentrations, even in extremely low concentrations, even parts per million, their presence can confer undesirable thermal instability to the polyamide. The practice of this invention reduces the formation of defect structures to the polyamide to a minimum.

This invention is particularly well adapted to manufacturing high quality nylon-6,6 polymer from adiponitrile, hexamethylene diamine, catalyst and water. However, this invention is also useful for the manufacture of nylon-4,4; nylon-4,6; and nylon-6,4 (from the appropriate dinitriles and diamines).

The following examples are illustrative of various embodiments of this invention. Unless noted to the contrary, all parts and percentages are by weight.

SPECIFIC EMBODIMENTS

Controls A–G and Examples 1–13

All the controls and examples were run in a Parr autoclave (450 ml) equipped with an anchor agitator.

The reactor was charged with adiponitrile (54.07 g, 0.5 moles), hexamethylene diamine (58.11 g, 0.5 moles), water (33.51 g) and catalyst (0.146 mole percent, generally between 0.1–0.89 g depending upon the molecular weight for catalyst). The reactor was then purged with nitrogen, sealed and connected to a back-pressure regulator adjusted to 750 psi absolute. The reaction mixture was then heated with stirring to 260° C. and the reaction was allowed to proceed at this temperature 3½ hours. The pressure within the reaction vessel was then reduced to atmospheric pressure over 30 minutes while the temperature was maintained at about 260° C. The reactor was then swept with nitrogen for 15 minutes and subsequently cooled to room temperature under a positive nitrogen pressure. Nylon-6,6 polymer was recovered from the reactor and ground to a size such that it would pass through a ten mesh (U.S. Standard) screen. Melting point and onset decomposition temperature (ODT) was measured by differential scanning calorimetry (DSC) which was also used to monitor programmed cooling crystallization. Weight loss was measured by thermal gravimetric analysis (TGA). Intrinsic viscosity was determined in formic acid (90 weight percent) at 25° C. Bulk viscosity was the time required for 0.415 g of polymer dissolved in 2 ml of 90 percent formic acid to traverse 0.8 ml in a 1 ml pipette at room temperature. Intrinsic viscosity and bulk viscosity are measurements which give indications of the molecular weight of the samples: the higher the viscosity, the higher the molecular weight.

Identification of catalysts and the results are reported in Table I.

TABLE I

Preparation of Nylon-6,6 from Adiponitrile and Hexamethylene Diamine Using Metal Salts of Phosphorus Compounds as Catalysts

| Con. Catalyst[a] | Bulk Viscosity (seconds) | Intrinsic Viscosity (dl/g) | DSC Onset decomp. Temp. (°C.) | TGA wt Loss (%) 250–325° C. | TGA wt Loss (%) 325–375° C. | TGA wt Loss (%) 375–390° C. | TGA wt Loss (%) 325–390° C. | DSC Programmed Cooling Crystallization Onset (°C.) | DSC Programmed Cooling Crystallization Peak (°C.) | DSC M.P. (°C.) |
|---|---|---|---|---|---|---|---|---|---|---|
| A None | 9.4 | 0.60 | 352 | 0.13 | 0.97 | 1.53 | 2.50 | — | — | 260 |
| B $H_3PO_4$* | 22.2 | 0.92 | 307 | 0.30 | 4.65 | 5.0 | 9.65 | 242 | 241 | 260 |
| C $H_3PO_3$ | 15.0 | 0.76 | 307 | 0.25 | 3.00 | 4.80 | 7.80 | 242 | 241 | 262 |
| D $H_3PO_2$ | 19.3 | 0.88 | 315 | 0.14 | 5.10 | 4.0 | 9.1 | 242 | 239 | 263 |
| E $(NH_4)_2HPO_4$ | 21.2 | — | 317 | 0.4 | 5.0 | >5.5 | >9.5 | — | — | 263 |
| F $[n-C_4H_9)_4N]_2HPO_4$ | 15.8 | — | 322 | 0.4 | 7.3 | >2.0 | >9.3 | 240 | 236 | 259 |
| G $[(CH_3)_4N]_2HPO_4$ | 12.4 | — | 310 | 0.5 | 4.1 | 5.1 | 9.2 | — | — | 262 |
| Ex. | | | | | | | | | | |
| 1 $NaH_2PO_4$ | 19.2 | 0.89 | 305 | 0.20 | 3.00 | 4.70 | 7.70 | 245 | 242,238 | 262 |
| 2 $Na_2HPO_4$ | 14.2 | 0.77 | 350 | 0.28 | 0.90 | 1.40 | 2.30 | 242 | 241 | 263 |
| 3 $Na_3PO_4$ | 22.1 | 0.94 | 325 | 0.18 | 0.65 | 1.40 | 2.05 | 241 | 232 | 257 |
| 4 $NaH_2PO_3$ | 14.4 | 0.78 | 315 | 0.30 | 2.90 | 4.50 | 7.40 | 246 | 241 | 263 |
| 5 $Na_2HPO_3$ | 14.6 | 0.76 | 330 | 0.20 | 1.10 | 1.80 | 3.90 | 244 | 243 | 257,267 |
| 6 $NaH_2PO_2$ | 17.0 | 0.85 | 310 | 0.26 | 3.00 | 4.90 | 7.90 | 242 | 239 | 263 |
| 7 $Na_4P_2O_7$ | 12.2 | 0.70 | 340 | 0.20 | 0.85 | 1.10 | 1.90 | 243 | 241 | 263 |
| 8 $Na_5P_3O_{10}$** | 15.0 | 0.73 | 340 | 0.40 | 3.2 | 4.8 | 8.0 | 236 | 229 | 256 |
| 9 $(NaPO_3)_6$ | 10.6 | 0.82 | 315 | 0.40 | 3.30 | 5.00 | 8.30 | — | — | 261 |
| 10 $Li_2HPO_3$ | 15.2 | 0.82 | 328 | 0.4 | 2.1 | 3.3 | 5.4 | 241 | 239 | 263 |
| 11 $LiNaHPO_3$ | 13.7 | 0.73 | 324 | 0.4 | 1.4 | 2.4 | 3.8 | 242 | 240 | 263 |
| 12 $Li_3PO_4$ | 17.4 | 0.84 | 344 | 0.3 | 1.1 | 1.8 | 2.9 | 240 | 233 | 259 |
| 13 $Mg_2P_2O_7$ | 16.8 | 0.83 | 332 | 0.4 | 2.3 | 4.2 | 6.5 | 242 | 237 | 263 |

*$H_3PO_4$ was used at 0.122 mole % level.
**Technical grade, 85% pure. Impurities unknown.

As the data in Table I shows, the TGA weight loss at 325°–390° C. was generally less for the polyamides made in Examples 1–13 than for the polyamides made in Controls B–G. Although the TGA weight loss for Control A was also relatively low, this polyamide was made by noncatalytic process. The bulk and intrinsic viscosities of the polyamide prepared in Control A were unacceptably low as compared to both the other controls and the examples.

EXAMPLES 14–19

The procedure of Controls A–G and Examples 1–13 was repeated except that only the acid portion of the catalyst was charged to the initial reaction mixture and the metal salt of the acid was formed after the completion of the first stage of the reaction, i.e. after the formation of the low molecular weight polyamides. In Examples 16 and 17, a lithium salt of the acid catalyst was charged to the initial reaction mixture but was further neutralized with one equivalent of sodium hydroxide at the completion of the first stage. The results of these examples are reported in Table II.

TABLE II

Preparation of Nylon-6,6 from Adiponitrile and Hexamethylene Diamine Using In Situ Generated Metal Salts of Phosphorus Compounds as Catalysts.

| Ex. | Catalyst Charged (0.146 mole %) | Catalyst Added After 3 Hrs. | Bulk Viscosity (seconds) | Intrinsic Viscosity (dl/g) | DSC Onset decomp. Temp. (°C.) | TGA wt Loss (%) 250–325° C. | TGA wt Loss (%) 325–375° C. | TGA wt Loss (%) 375–390° C. | TGA wt Loss (%) 325–390° C. | DSC Programmed Cooling Crystallization Onset (°C.) | DSC Programmed Cooling Crystallization Peak (°C.) | DSC M.P. (°C.) |
|---|---|---|---|---|---|---|---|---|---|---|---|---|
| 14 | $H_3PO_3$ | NaOH (2 equiv) | 29.1 | 1.07 | 364 | 0.2 | 0.5 | 1.0 | 1.5 | 243,241 | 264 | 264 |
| 15 | $H_3PO_4$ | NaOH (2 equiv) | 18.6 | 0.91 | 350 | 0.3 | 0.7 | 1.7 | 2.4 | 243 | 240 | 262 |
| 16 | $LiH_2PO_3$ | 1 NaOH | 33.4 | 1.12 | 344 | 0.3 | 0.9 | 1.5 | 2.4 | 242 | 240 | 264 |
| 17 | $LiH_2PO_4$ | 1 NaOH | 44.0 | 1.19 | 325 | 0.3 | 1.4 | 1.0 | 2.4 | 244 | 239 | 263 |
| 18 | $H_3PO_3$ | 1.9 NaOH | 28.5 | 1.03 | 335 | 0.3 | 1.3 | 1.8 | 3.1 | 243 | 240 | 264 |

TABLE II-continued

| | Catalyst | | | | | | | | | DSC Programmed Cooling Crystallization | | |
|---|---|---|---|---|---|---|---|---|---|---|---|---|
| | Charged (0.146 | Added After | Bulk Viscosity | Intrinsic Viscosity | DSC Onset decomp. | \multicolumn{4}{c}{TGA wt Loss (%)} | | | DSC M.P. |
| Ex. | mole %) | 3 Hrs. | (seconds) | (dl/g) | Temp. (°C.) | 250–325° C. | 325–375° C. | 375–390° C. | 325–390° C. | Onset (°C.) | Peak (°C.) | (°C.) |
| 19 | H₃PO₃ | 2.1 NaOH | 21.9 | 0.92 | 347 | 0.3 | 1.0 | 2.8 | 3.8 | 244 | 240 | 263 |

Preparation of Nylon-6,6 from Adiponitrile and Hexamethylene Diamine Using In Situ Generated Metal Salts of Phosphorus Compounds as Catalysts.

As evidenced by both the bulk viscosity numbers and the relatively low TGA weight loss at 325°–390° C. numbers, polyamides prepared from in situ generated metal salts of phosphorus compounds not only generally display superior physical characteristics to the polyamides prepared in the Controls, but also as compared to the polyamides prepared in Examples 1–13.

Although the invention has been described in considerable detail through the preceding examples, these examples are for the purpose of illustration only and one skilled in the art will understand that variations and modifications can be made without departing from the spirit and scope of the invention.

What is claimed is:

1. In a process for the manufacture of a spinnable polyamide, the process comprising contacting an $\alpha,\omega$-dinitrile, an $\alpha,\omega$-diamine, water and a catalyst at an elevated temperature and pressure, the improvement wherein the catalyst is at least one metal salt of an oxygenated phosphorus compound.

2. The process of claim 1 where the metal salt of an oxygenated phosphorus compound is selected from the Group consisting of the metal salts of phosphoric acid, phosphorous acid, hypophosphorus acid, an alkyl or aryl phosphonic acid, and an alkyl or aryl phosphinous acid.

3. The process of claim 1 where the metal component of the catalyst is a univalent metal cation.

4. The process of claim 3 where the metal cation is an alkali metal cation.

5. The process of claim 1 where the metal salt of an oxygenated phosphorus compound is selected from the group consisting of the sodium and lithium salts of phosphorous and phosphoric acid.

6. The process of claim 1 where the catalyst is the disodium salt of phosphorous or phosphoric acid.

7. The process of claim 1 where the catalyst is the dilithium salt of phosphorous or phosphoric acid.

8. The process of claim 1 where the catalyst is the lithium-sodium salt of phosphorous or phosphoric acid.

9. The process of claim 2 where the catalyst is generated in situ.

10. The process of claim 5 where the catalyst is generated in situ after low molecular weight polyamides are formed in the reaction mixture.

11. The process of claim 2 where the catalyst is present in an amount between about 0.001 to about 1 weight percent based upon the total weight of the diamine, dinitrile and water.

12. The process of claim 2 where the diamine is of the formula $$R'HN-R-NHR' \qquad (I)$$

and where the dinitrile is of the formula $$NC-R-CN \qquad (II)$$

where R is a divalent organic radical and each R' is independently hydrogen or a univalent organic radical.

13. The process of claim 12 where R is a divalent $C_1-C_{20}$ aliphatic, divalent $C_5-C_{18}$ alicyclic or divalent benzene radical and each R' is independently hydrogen, a univalent $C_1-C_{20}$ aliphatic, univalent $C_5-C_7$ alicyclic or a phenyl radical.

14. The process of claim 12 where R is a $C_2-C_8$ straight chain alkylene radical and R' is hydrogen or a $C_1-C_4$ alkyl radical.

15. The process of claim 14 where the diamine is hexamethylene diamine and the dinitrile is adiponitrile.

16. The process of claim 15 where the catalyst is an alkali metal salt of phosphorous or phosphoric acid.

17. The process of claim 15 where the catalyst is a sodium or lithium salt of phosphorous or phosphoric acid.

18. The process of claim 16 where the catalyst is generated in situ.

19. In a process for the manufacture of a spinnable polyamide, comprising contacting an $\alpha,\omega$-dinitrile, an $\alpha,\omega$-diamine, water and an oxygenated phosphorus catalyst, at an elevated temperature and pressure, the improvement comprising at least partially neutralizing the acidic protons of the catalyst after the $\alpha,\omega$-dinitrile is at least 50 percent hydrolyzed.

* * * * *